United States Patent [19]
Maehara

[11] Patent Number: 5,274,540
[45] Date of Patent: Dec. 28, 1993

[54] INVERTER DEVICE FOR STABLE, HIGH POWER-FACTOR INPUT CURRENT SUPPLY

[75] Inventor: Minoru Maehara, Osaka, Japan

[73] Assignee: Matsushita Electric Works, Ltd., Osaka, Japan

[21] Appl. No.: 798,652

[22] Filed: Nov. 26, 1991

[30] Foreign Application Priority Data

Nov. 27, 1990 [JP] Japan .................. 2-327324
Aug. 22, 1991 [JP] Japan .................. 3-211187
Aug. 22, 1991 [JP] Japan .................. 3-211188

[51] Int. Cl.⁵ ............................... H02M 5/458
[52] U.S. Cl. ............................. 363/37; 363/40; 363/124; 363/132
[58] Field of Search ............... 363/34, 37, 39, 40, 363/124, 131, 132, 133, 134

[56] References Cited

U.S. PATENT DOCUMENTS

| | | | |
|---|---|---|---|
| 4,499,533 | 2/1985 | Okamoto | 363/126 |
| 4,511,823 | 4/1985 | Eaton et al. | 315/226 |
| 4,564,987 | 1/1906 | Okamoto et al. | 363/37 |
| 4,706,180 | 11/1987 | Wills | 363/132 |
| 4,933,831 | 6/1990 | Takahashi et al. | 363/124 |
| 5,045,989 | 9/1991 | Higaki et al. | 363/134 |
| 5,063,490 | 11/1991 | Maehara et al. | 363/124 |

FOREIGN PATENT DOCUMENTS 60-134776 7/1985 Japan .
2-211065 8/1990 Japan .

Primary Examiner—J. L. Sterrett
Attorney, Agent, or Firm—Leydig, Voit & Mayer

[57] ABSTRACT

An inverter device for supplying a stable, high power-factor input current while restraining higher harmonics to be low is provided by a simple circuit structure in which a pulsating DC voltage supplied through a power circuit is provided to a smoothing condenser, a direct current is provided from the smoothing condenser to an inverter circuit section, and an input current path is formed from the power circuit through an impedance element to a switching element of the inverter circuit section and to part of an oscillation circuit.

36 Claims, 13 Drawing Sheets

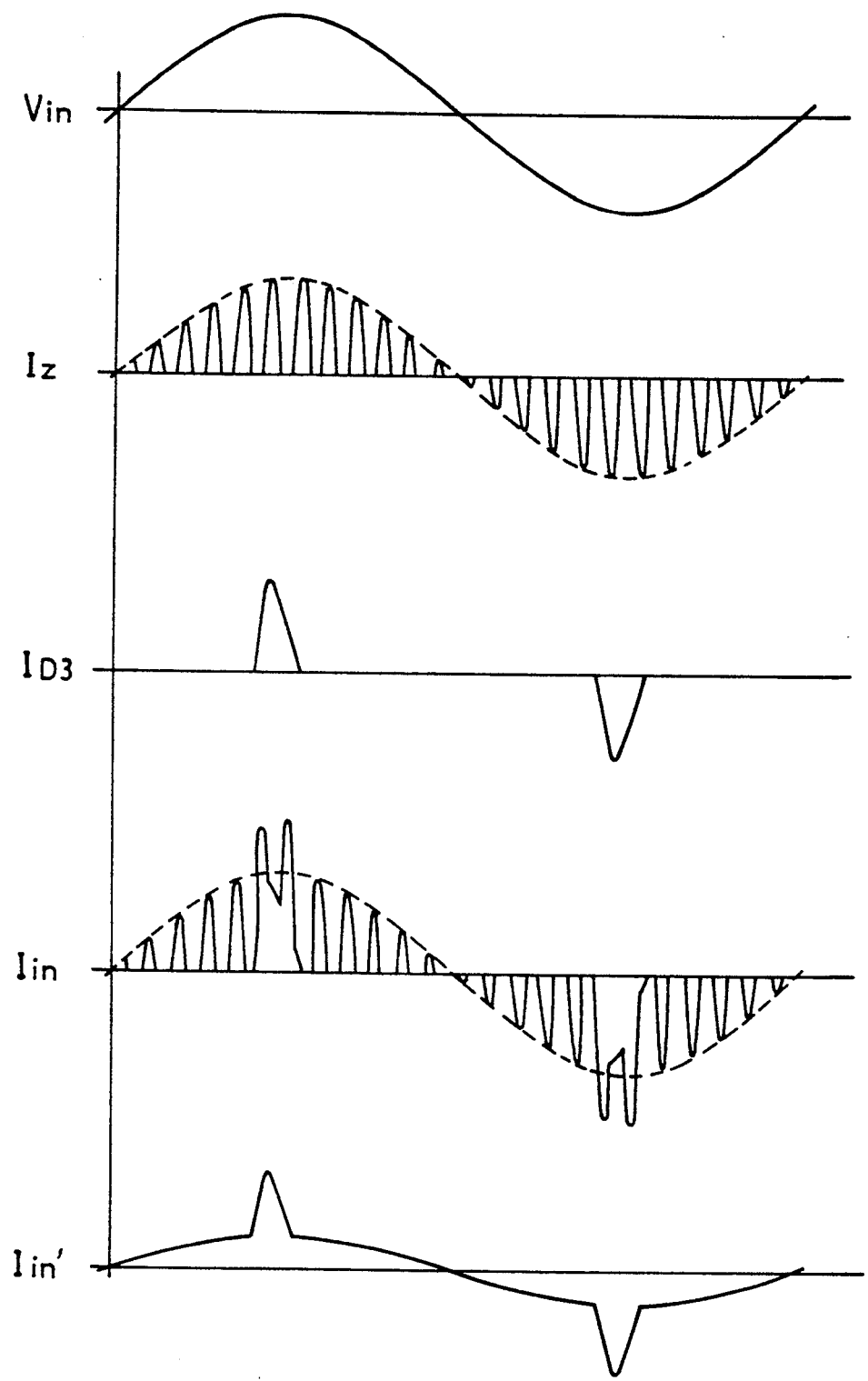

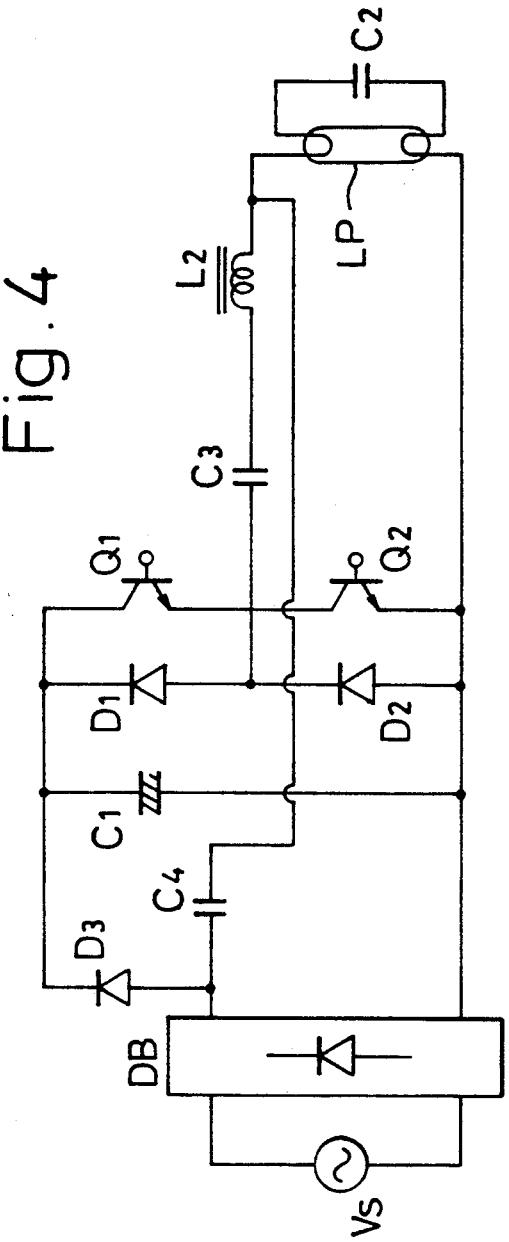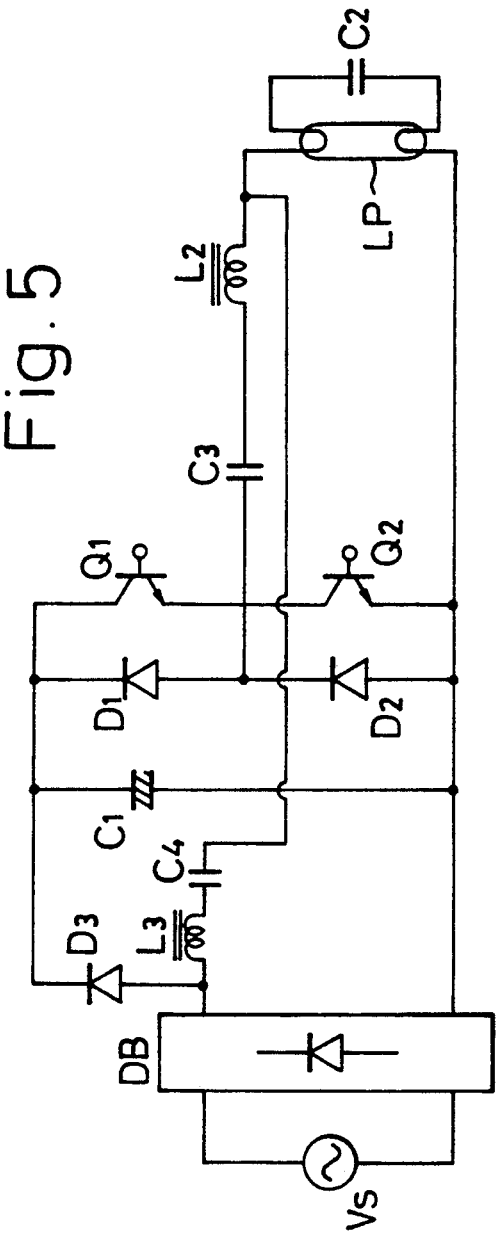

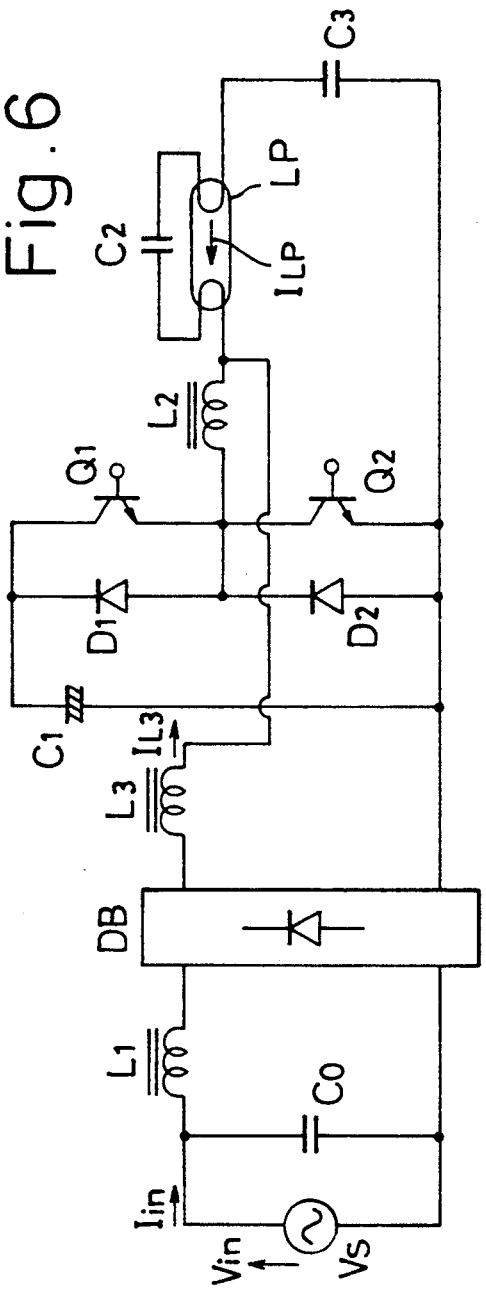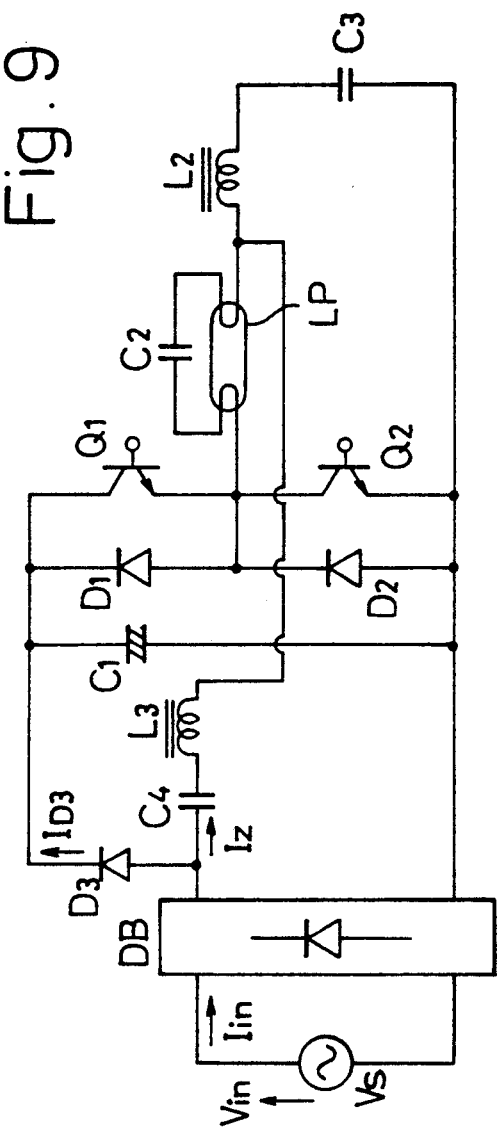

INVERTER DEVICE FOR STABLE, HIGH POWER-FACTOR INPUT CURRENT SUPPLY

BACKGROUND OF THE INVENTION

This invention relates generally to inverter devices and, more particularly, to the inverter device which supplies to a load a high frequency converted from a DC voltage obtained by rectifying and smoothing an AC source power.

The inverter device of the kind referred to finds its utility when utilized in, for example, lighting fixtures and the like which demanding a supply of stable high frequency current.

DESCRIPTION OF RELATED ART

General inverter devices have been constituted preferably by connecting an inverter circuit section, with a chopper circuit interposed, to a full-wave rectifier which is connected through a filter circuit to an AC power source, so as to render input power-factor with respect to the inverter circuit section to be at a high level while reducing higher harmonics component in input current. Thus constituted devices have shown on one hand improvements in the input power-factor and so on but have involved on the other hand a problem that the chopper circuit which is separate from the inverter circuit section has to be provided so that the entire device circuit is required to be complicated and thereby enlarged in size and raised in costs.

In Japanese Patent Laid-Open Publication No. 60-134776, there has been disclosed an inverter device in which an inverter circuit section of a so-called half-bridge arrangement of first and second transistors, first and second diodes, first and second condensers and a transformer connected to a load is provided, and an inductance is connected at an end to an output end of a full-wave rectifier and at the other end to a collector of the second transistor in the inverter circuit section. In this inverter device, the inductance, second transistor and first diode are to function as the chopper circuit. Now, with the second transistor turned ON, a current is caused to flow through a path through the full-wave rectifier, inductance and second transistor, and the inductance is caused to store an energy. When on the other hand the second transistor is turned OFF, an induced electromotive force is generated in the inductance, and this electromotive force charges through the first diode a condenser connected in parallel to a series circuit of the first and second diodes. The first and second transistors are alternately turned ON and OFF so as to act as a switching element of the inverter circuit section providing to the load a high frequency while the second transistor also performs a chopper action so as to be employable in common to both ways, and the inverter device can be decreased in required number of circuit elements so as to be simplified.

However, the current made to flow to this second transistor employed in common to the both ways is made to be about two times as large as that when employed in single way, due to simultaneous flow of a current to an inverter operating section and a further current to the chopper operating section. Consequently, any loss or stress at the second transistor becomes considerably larger than the first transistor, and it is required to use a larger element as the second transistor or to take a measure for remarkably improving heat radiation efficiency for the second transistor. In all events, there arises a difference in the magnitude of the currents respectively flowing to the first and second transistors, so as to cause a problem to occur in that circuit design becomes uneasy.

In Japanese Patent Laid-Open Publication No. 2-211065, there has been disclosed an inverter device in which first and second transistors are connected to first and second diodes on one side of two series circuits of first to fourth diodes, first and second smoothing condensers are connected to an output end of a full-wave rectifier and a load is connected between a junction point of the first and second transistors and a junction point of the first and second smoothing condensers, so that a half-bridge type inverter circuit section can be connected to the full-wave rectifier. In this case, an AC power source is connected, through an inductance, between a junction point of the first and second diodes which forms an AC input end of the full-wave rectifier and a junction point of the third and fourth diodes, and a chopper circuit is formed by an inductance, the first and second transistors and the first to fourth diodes forming the full-wave rectifier.

When in this arrangement a source power voltage is on positive side, the first transistor turned ON renders a current to flow from the source through a path of the inductance, third diode and first transistor, and the inductance stores therein an energy. As the first transistor turns OFF on the other hand, an induced electromotive force is generated in the inductance, and thereby the first and second smoothing condensors are charged through the third and second diodes. Further, when the source power voltage is on negative side, the second transistor is made to act as a switching element in the chopper circuit, the current from the source is made to flow to the inductance through a path of the second transistor, fourth diode and inductance, and thereby the first and second smoothing condensers are charged through the first and fourth diodes. It is appreciated that, when this operation is sequentially carried out, the first and second transistors operate alternately as the switching element of the chopper circuit every time when the source voltage is on the positive and negative sides of the source voltage, and these first and second transistors are also forming the switching element of the inverter circuit section.

Accordingly, in this known inverter device, both of the first and second transistors are used as the switching element common to the inverter circuit and chopper circuit, so that any losses or stresses at the transistors in the both circuits can be equalized to render the circuit designing relatively easier in respect of the heat radiation of the transistors ans so on. In this inverter device, however, there is involved such a drawback that, since the chopper operation is carried out by different one of the first and second transistors on every side of the positive and negative sides of the source power voltage when these transistors operate as part of the chopper circuit, and it becomes difficult to control outputs of the chopper circuit.

Further, in any of the foregoing known devices, there has been involved a problem that, since they include such multi-stage conversions as the rectification from AC to DC (pulsating current), smoothed DC from the pulsating current and high frequency from the smoothed DC, the overall efficiency which is calculated out by dividing the output power with the input power is deteriorated.

Further, there has been disclosed in U.S. Pat. No. 4,511,823 another inverter device in which higher harmonics in the input current from the AC power source are reduced. In this known device, however, alternate charge and discharge of condensers 17 and 18 are made effective to cause a supply current generated for a larger part of every cycle of the source power, so as to render the input current to have a waveform similar to a sinusoidal wave.

SUMMARY OF THE INVENTION

A primary object of the present invention is, therefore, to provide an inverter device which is capable of eliminating the foregoing problems involved in the prior art and enabling a stable and high level input current to be supplied which keeping the high harmonics to be low and a simplified circuit arrangement to be realized.

According to the present invention, this object can be attained by means of an inverter device in which a pulsating DC voltage is provided from a rectifier receiving a source power voltage from an AC power source to a smoothing condenser, a direct current is applied from the smoothing condenser to a load circuit and to an inverter circuit section having an oscillation circuit including such load as a discharge lamp, the direct current from the smoothing condenser is applied to a switching element included in the inverter circuit section and also forming part of a chopper circuit, and then a high frequency voltage is applied to a load element of the oscillation circuit in response to ON/OFF operation of the switching element, characterized in that an impedance element is inserted between at least one of an output end of the AC power source and an output end of the rectifier and the inverter circuit section so as to form a direct input current path from the AC power source through the impedance element, switching element and part of the oscillation circuit.

Other objects and advantages of the present invention shall be made clear in following description of the invention detailed with reference to various embodiments of the invention as shown in accompanying drawings.

Now, the term "inverter device" used in the following description is to refer to a device comprising a rectifier, a chopper circuit, an inverter circuit section, a smoothing condenser, an oscillation circuit and, if required, an input improving means, rush current preventing means and so on.

The term "inverter circuit section" in the above is to refer to a circuit part which converts a DC input current into the high frequency current.

Further, the term "oscillation circuit" in the above is to refer to a circuit which comprises an inductance element, an oscillation condenser and a circuit including such a resistance component or a load such as a discharge lamp.

The term "part of the oscillation circuit" refers to an aspect of the circuit from which one or more of circuit elements constituting an oscillation circuit is omitted.

BRIEF EXPLANATION OF THE INVENTION

FIG. 3 is a diagram showing waveforms at respective parts in the inverter device of FIG. 2;

FIG. 4 is a circuit diagram showing a second embodiment of the inverter device according to the present invention;

FIG. 5 is a circuit diagram showing a third embodiment of the inverter device according to the present invention;

FIG. 6 is a circuit diagram showing a fourth embodiment of the inverter device according to the present invention;

FIG. 9 is a circuit diagram showing a sixth embodiment of the inverter device according to the present invention;

Figure 1:
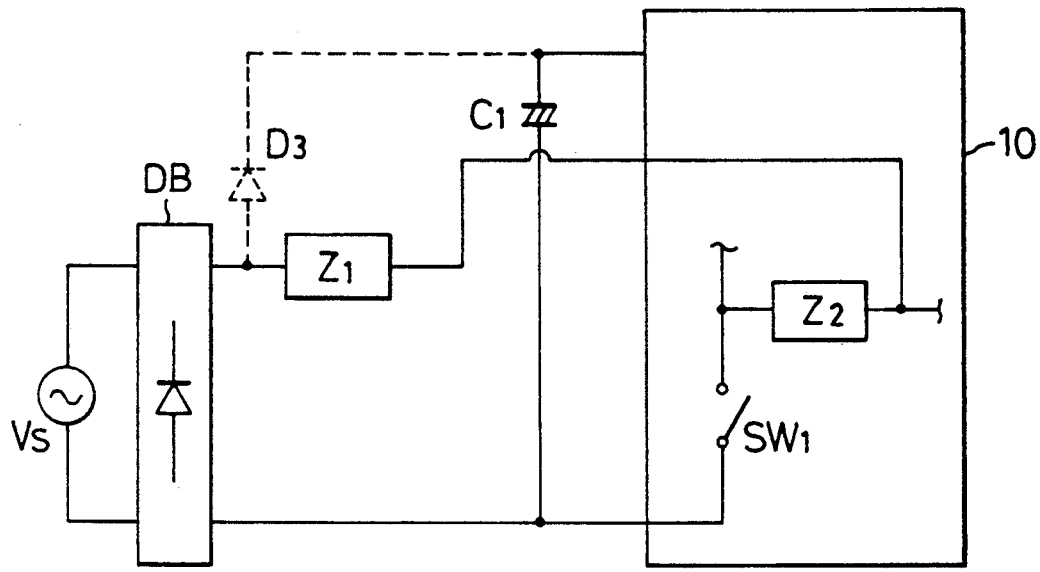
FIG. 1 is a schematic circuit diagram showing a basic arrangement of the inverter device according to the present invention.

While the present invention shall now be described with reference to the embodiments shown in the drawings, it should be appreciated that the intention is not to limit the invention only to these embodiments but to rather include all alterations, modifications and equivalent arrangements possible within the scope of appended claims.

DETAILED DESCRIPTION OF THE PREFERRED EMBODIMENTS

According to a remarkable feature of the present invention, the inverter device is basically arranged in such that an impedance element is inserted between an output end of a power source circuit including an AC power source as well as a rectifier for an input from the AC power source and an inverter circuit section, and an input current path is formed from the power source circuit through the impedance element, a switching element and part of an oscillation circuit.

Referring more specifically to this basic arrangement by references to FIG. 1, it is now assumed that a switching element SW1 turns ON and OFF at a high speed, then a current is caused to flow through a path of a full-wave rectifier DB, an impedance element Z1 and an element Z2 forming part of an oscillation circuit of an inverter circuit section 10 to the switching element SW1, and an input current is made to flow without any quiescent period to the inverter circuit section 10 and eventually to a load over the whole cycle of the AC power source Vs, so as to render the input power-factor to be high. Further, with a smoothing condenser C1 made as a DC power source, a high frequency current is supplied by the inverter circuit section 10 to the load circuit. When the switching element SW1 turns ON here, part of the oscillation circuit Z2 in the inverter circuit section 10 receives the high frequency current from the inverter circuit section 10, and a current is made to flow through a path through the full-wave rectifier DB and impedance element Z1, due to which part of the oscillation circuit Z2 is employed commonly in the inverter circuit section 10 and a chopper which is an input power-factor improving means, whereby the common use of the circuit element is more efficiently attained than in the case of the known inverter devices and the simplification of the circuit arrangement is further attained. In addition, the use of the foregoing arrangement allows the current to flow also in a direct manner from the power source circuit only through the impedance element Z1 to the inverter circuit section or part of the oscillation circuit Z2, so that the power supply to part of the oscillation circuit Z2 can be realized for a certain period while avoiding such two step conversions as a conversion of a pulsating current into a smoothed current and thereafter a conversion from the smoothed current into a high frequency current, and the overall efficiency can be elevated while restraining the higher harmonics to be at a low level.

In the inverter device of FIG. 1, a diode D3 can be connected as required to an output end of the rectifier DB, so that the current to the impedance element Z1 will be inverted for charging the smoothing condenser C1 through this diode D3 or a current of a direction inverse to that upon the turning ON of the switching element SW1 can be caused to flow to the inverter circuit section 10, as will be readily appreciated.

Various embodiments practically employable of the foregoing inverter devices shall be described in the followings.

Figure 2:
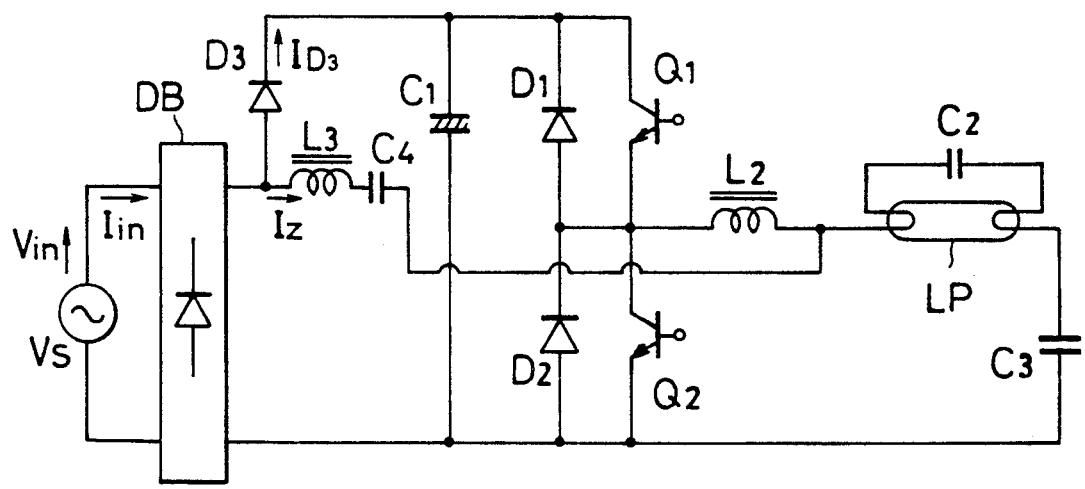
FIG. 2 is a circuit diagram showing a first embodiment of the inverter device according to the present invention.

Referring to FIG. 2, there is shown a first embodiment of the inverter device according to the present invention, in which a series circuit of an inductance L3 and condenser C4 is employed as the impedance element Z1 in the basic arrangement of FIG. 1 and an inductance L2 is employed as part of the oscillation circuit Z2 also in the arrangement of FIG. 1. Further, an oscillating condenser C2 is connected to the inductance L2 to form a series resonance circuit therewith, a discharge lamp LP is connected as a load to this condenser C2, and a DC cut condenser C3 is connected to the lamp LP. Here, these oscillating condenser C2 and DC cut condenser C3 are so set in the capacity as to be C3>>C2 to allow the device circuit to be designed for rendering the DC cut condenser C3 not to participate in the oscillation. Further, the inverter circuit section is formed with transistors Q1 and Q2 and diodes D1 and D2 additionally connected to the inductance L2, condensers C2 and C3 and discharge lamp LP.

In this inverter device, the transistors Q1 and Q2 are turned ON and OFF at a high speed, the DC current from the smoothing condenser C1 is converted into a high frequency current and the discharge lamp LP can be thereby subjected to a high frequency lighting, upon which the oscillating condenser C2 is forming part of an electric preheating path for filaments of the discharge lamp LP. On the other hand, a series circuit of the inductance L2 as part of an oscillation circuit and the transistor Q2 is connected to an output end of the full-wave rectifier DB through the series circuit of the inductance L3 and condenser C4 so that, as the transistor Q2 is turned ON, an input current is made to flow through a path from the full-wave rectifier DB through the inductance L3, condenser C4 and inductance L2 to the transistor Q2. Here, the inductance L3, condenser C4 and inductance L2 constitute a resonance system so that, when the direction of the current is inverted, an accumulated charge in the condenser C4 will be discharged, flowing through a first path from the condenser C4 through the inductance L3, diode D3 and transistor Q1 to the inductance L2 and through a second path from the condenser C4 through the inductance L3, diode D3, condenser C1, condenser C3 and discharge lamp LP to the condenser C4. Through which one of these first and second paths the charge thus discharged passes is determined by a resonance frequency and switching frequency of the inductance L3, condenser C4 and inductance L2.

The foregoing operation is repeated for the whole cycle of the AC power source Vs as has been partly described, so that the input current will be caused to flow constantly and the input power-factor can be elevated.

Further, when an LC filter circuit comprising a condenser and inductance is inserted in the embodiment of FIG. 2 between, for example, the AC power source Vs and the full-wave rectifier DB, it is made possible to supply the input current in a waveform close to a sinusoidal wave. That is, with reference to FIG. 3 in conjunction with FIG. 2, a waveform Vin is of the input voltage, Iz is of an input-current component which passes through the inductance L3 and condenser C4, ID3 is of another input-current component which passes through the diode D3, and Iin is of the input current, whereas Iin' is a waveform of an input current in an event where a filter circuit is inserted in the power source, which waveform Iin' can be rendered to be closer to the sinusoidal wave than in the case when no filter circuit is employed. Here, projected parts of the input current Iin' adjacent the peak values of the input voltage Vin are due to the current caused to directly flow from the power source through the diode D3, and these projected parts of the input current Iin can be reduced by properly setting a constant of the inductance L3 and condenser C4.

In the embodiment of FIG. 2, therefore, the inductance L2 forming part of the oscillation circuit is to be employed in common to both of the inverter circuit section and in the input power-factor improving means, that is, the means including such elements for improving the input power-factor as a chopper circuit, a circuit performing a restraining action of the higher harmonics component, the filter circuit to be inserted in the power source and so on, so that the common use of the circuit elements can be enhanced so as to be able to contribute to a sufficient dimensional minimization. With respect to the inductance L2, further, the current from the power source circuit is made to flow partly directly, without through the two-stage conversions of that from the pulsating current to the smoothed current (DC-DC conversion) and that from the smoothed current to the high frequency current (DC-AC conversion), to remarkably improve the overall efficiency, as will be readily appreciated.

Further, as has been referred to with reference to the basic arrangement of FIG. 1, the diode D3 contributes to the utilization of the inverted current of the inductance L3 and condenser C4 but is not essential and, if intended to provide a function of discharging the accumulated charge in the condenser C4 with the inverted current made to flow, then a resistor may be inserted, for example, in parallel to the inductance L3 and condenser C4.

In a second embodiment shown in FIG. 4, in contrast to part of the oscillation circuit Z2 of the inverter circuit section in the first embodiment of FIG. 2 which part of the oscillation circuit Z2 being a single element, the condenser C3 not participating in any oscillation and connected in series to the inductance L2 is additionally included in the part of the oscillation circuit Z2, while the condenser C4 only is employed as the impedance element Z1. In the present embodiment, other constituents as well as the function and effect are the same as those in the first embodiment of FIG. 2.

In a third embodiment shown in FIG. 5, the impedance element Z1 is formed in the same manner as in the first embodiment of FIG. 2, and part of the oscillation circuit Z2 is constituted by such inductance L2 and condenser C3 as in the second embodiment of FIG. 4. In the present instance, other constituents as well as the function and effect are the same as those in the first embodiment of FIG. 2.

In a fourth embodiment shown in FIG. 6, such filter circuit as has been described with reference to the first embodiment of FIG. 2 and comprising a condenser C0 and an inductance L1 is inserted practically between the AC power source Vs and the full-wave rectifier DB while, in contrast to the first embodiment of FIG. 2, the impedance element Z1 comprises only the inductance L3 and the diode D3 connected to the one output end of the rectifier DB is omitted. When in the present embodiment the transistor Q2 is turned ON, an input current flows through a path from the full-wave rectifier DB through the inductances L3 and L2 to the transistor Q2, upon which the current at the inductance L3 is proportional in its incremental gradient to an instantaneous value of the input voltage Vin. On the other hand, with the condenser C3 made as a power source, a current also flows through a path from the condenser C3 through the discharge lamp LP and inductance L2 to the transistor Q2, and a current is caused to flow to the load through the discharge lamp LP in a direction of an arrow ILP as shown in the drawing.

As the transistor Q2 turns OFF, next, the current at the inductance L3 flows to a path through the inductance L2, diode D1 and smoothing condenser C1, and this smoothing condenser C1 is charged thereby. A current also flows to a path through the condenser C3, discharge lamp LP, inductance L2, diode D1 and smoothing condenser C1, the energy in the oscillation circuit is subjected to a feedback to the smoothing condenser C1 and, at this time, the current of the arrow ILP to the load in the discharge lamp LP is decreased.

As the transistor Q2 turns OFF to allow the currents to flow to the foregoing paths for a fixed period and the current at the inductance L2 is inverted, the transistor Q1 is now turned ON, upon which the current at the inductance L3 is made also to flow to a path through the discharge lamp LP and condenser C3 and a current is caused to directly flow through the discharge lamp LP. On the other hand, a current is also made to flow from the smoothing condenser C1 to a path through the transistor Q1, inductance L2, discharge lamp LP and condenser C3, and the current to the load is caused to flow in a direction inverse to the arrow ILP in the drawing. Further, as the transistor Q1 turns OFF, the energy in the inductance L3 causes a current to flow from the inductance L3 to a path through the discharge lamp LP and condenser C3, and also a current is made to flow to a path through the inductance L2, discharge lamp LP, condenser C3 and diode D2, upon which the current to the load inverse to the arrow ILP is caused to decrease. Then, the transistor Q2 turns ON again, and the above described operation is repeated. While the inductance L3 acts as a chopper choke for charging the smoothing condenser C1, it also functions to cause the current to flow to the load.

Figure 7:
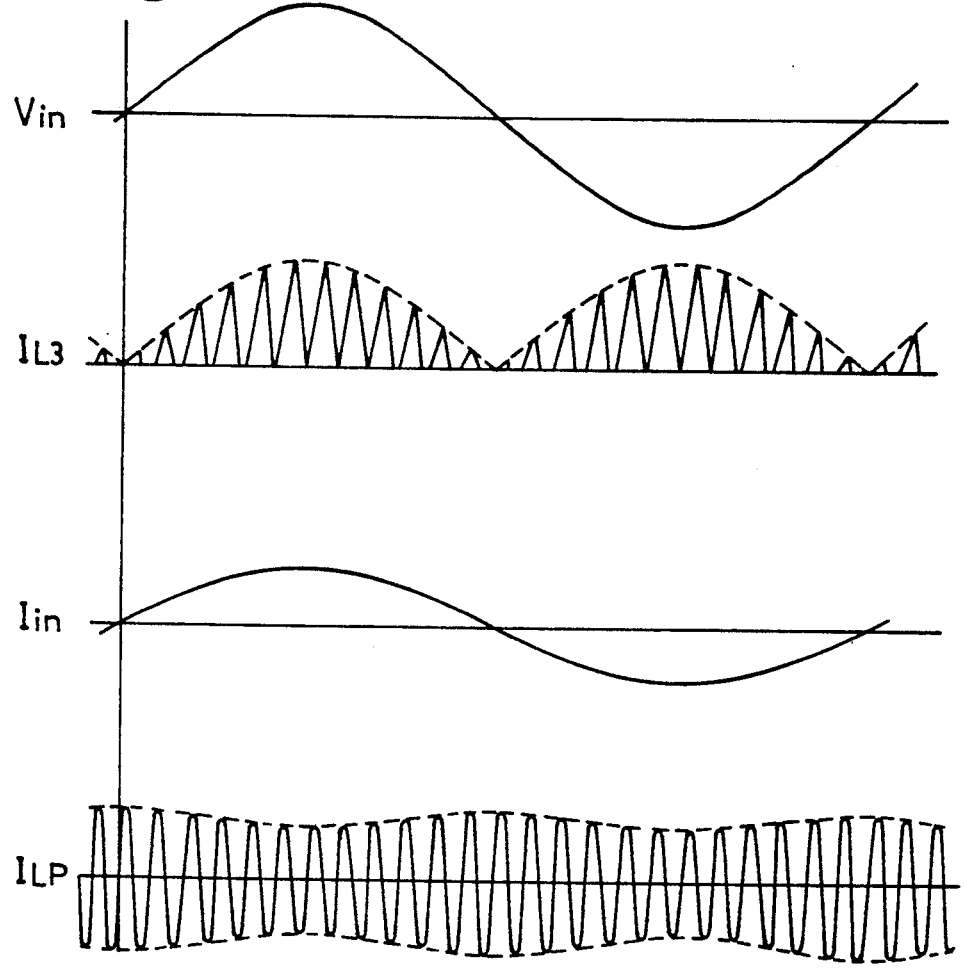
FIG. 7 is a diagram showing waveforms at respective parts in the inverter device of FIG. 6.

Referring now to the operation of the fourth embodiment of FIG. 6 in conjunction with FIG. 7 showing waveforms at respective parts, the waveform Vin is of the input voltage, IL3 is of the current flowing through the inductance L3, Iin is of the input current after passing through the filter circuit, and ILP is of the current flowing through the discharge lamp LP. As will be clear from the input current waveform, the input power-factor is made higher and the higher harmonics component of the input current is restrained. The load current ILP is made smaller in the amplitude as the input voltage Vin is made higher, mainly for such a reason that, while the current Iin of an intensity proportional to the input voltage Vin flows to the inductance L3, the function of this inductance L3 is so made as to partly disturb increments in the load current ILP.

Further, the output of the rectifier are so made as to be switched over through part of the oscillation circuit of the inverter circuit section, the common use of the circuit elements can be enhanced to simplify the structure, and the inverter device can be remarkably minimized in size in contrast to the known devices. Partly, a current is caused to flow directly from the rectifier to the load, upon which the converting operation from the pulsating current into the smoothed direct current is omitted in similar manner to the foregoing embodiments, and the overall factor can be improved. In the present embodiment, further, the load current ILP is varied in the amplitude in inverse proportion to the magnitude of the input voltage Vin, and any variation in the effective value of the load current ILP is made smaller with respect to a source power fluctuation, so that a function of compensating for the source power fluctuation is to be shown. Further, a minimization to a considerable extent in the capacity of the smoothing condenser C1 causes almost no variation to occur in waveform envelopes of the load current ILP so that the smoothing condenser C1 of a small capacity is required for the present embodiment in contrast to any known device which has been requiring an electrolytic condenser of a large capacity for the smoothing condenser C1 and, in this respect, too, the dimensional minimization can be enhanced.

Figure 8:
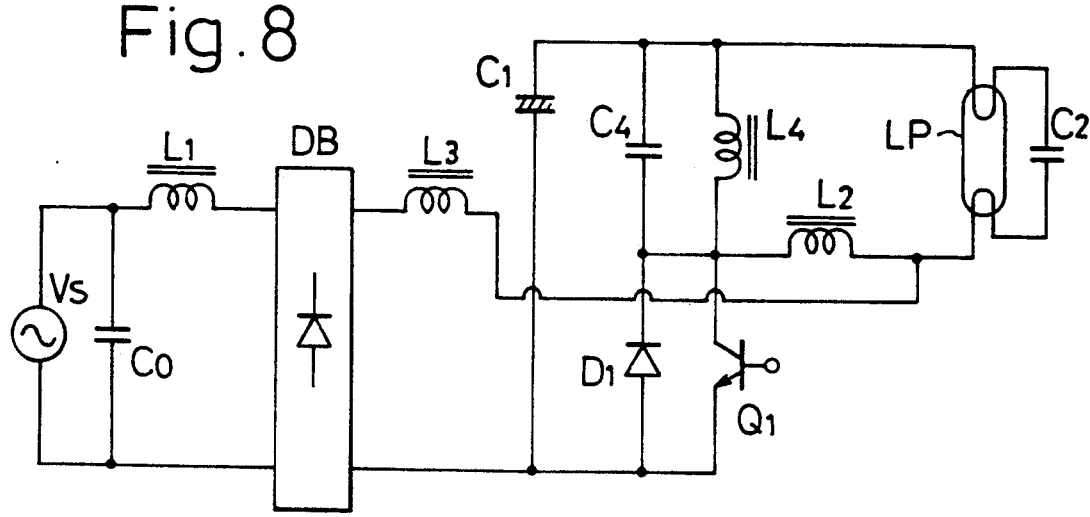
FIG. 8 is a circuit diagram showing a fifth embodiment of the inverter device according to the present invention.

In a fifth embodiment shown in FIG. 8, in contrast to the foregoing embodiments, the inverter circuit section is made to comprise only one transistor Q1 together with the diode D1, inductances L2 and L4, condensers C2 and C4 and discharge lamp LP. In this inverter circuit section, a high frequency power is supplied to the discharge lamp LP by means of a resonating action of the condensers C2 and C4 and inductances L4 and L2. Also in similar manner to the fourth embodiment of FIG. 6, a current is caused to flow directly to the full-wave rectifier DB, inductances L3 and L2 and transistor Q1. Other constituents as well as the function and effect are the same as those in the foregoing embodiments.

In a sixth embodiment shown in FIG. 9, a series circuit of the condenser C4 and inductance L3 is employed as the impedance element Z1 in the basic arrangement of FIG. 1. For part of the oscillation circuit Z2 in the inverter circuit section, the condenser C2 is employed, and the discharge lamp LP is connected in parallel to this condenser C2. In this case, the input current is made to be of an oscillating waveform of a high frequency to minimize any noise component, by the employment of the series circuit of the condenser C4 and inductance L3 as the impedance element Z1. Here, the current flowing through the series circuit of the condenser C4 and inductance L3 is an oscillating current, and the direction of this current is inverted after a fixed period of time lapsed, upon which the diode D3 is made ON to cause a current to flow through the transistor Q1 and discharge lamp LP. Accordingly, it is enabled with this arrangement to cause the input current to directly flow to part of the oscillation circuit C2 in the inverter circuit section and to the discharge lamp LP without such two stage conversion as that from the pulsating direct current to the smoothed direct current and that from the smoothed direct current to the high frequency, so that the overall efficiency can be improved, and the input power-factor can be elevated while restraining the higher harmonics current to be at a low level. Other constituents as well as the function and effect are the same as those in the foregoing embodiments.

Figure 10:
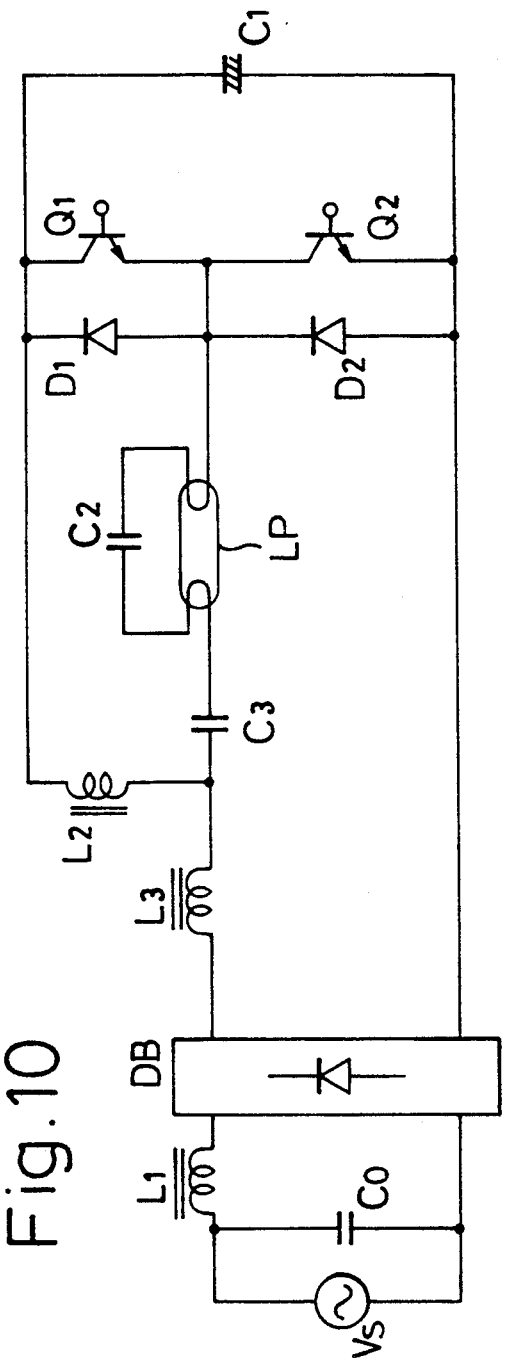
FIG. 10 is a circuit diagram showing a seventh embodiment of the inverter device according to the present invention.

In a seventh embodiment shown in FIG. 10, the inductance L3 is employed as the impedance element Z1 in the basic arrangement of FIG. 1, and the condenser C2 is used as part of the oscillation circuit Z2 in the basic arrangement. To the condenser C2, the discharge lamp LP is connected in parallel, and the condenser C3 not participating in the oscillation similarly to that in the embodiment of FIG. 5 is connected in series to the lamp. In this case, the oscillation circuit of inverter circuit section is formed by the inductance L2, condenser C2 and discharge lamp LP and, in response to alternate turning ON and OFF at high speed of the transistors Q1 and Q2, the high frequency current is caused to flow to the discharge lamp LP. As the transistor Q2 turns ON, first, a current is caused to flow from the smoothing condenser C1 to a path through the inductance L2, condenser C3, discharge lamp LP and transistor Q2, while a current is also made to flow partly to the discharge lamp LP through a path of the inductance L3, condenser C3, discharge lamp LP and transistor Q2. When this transistor Q2 turns OFF, the oscillation circuit of the inverter circuit section causes the diode D1 to turn ON so as to form a closed loop together with the condenser C3, upon which the energy accumulated in the inductance L3 is discharged through the condenser C3, condenser C2, discharge lamp LP and diode D1 to the smoothing condenser C1 to have the same charged. As the transistor Q1 turns ON, a current inverse directional to the above is caused to flow to the discharge lamp LP from the condenser C3 through a path of the inductance L2, transistor Q1 and discharge lamp LP, upon which any residual energy in the inductance L3 is discharged through the inductance L2 to the condenser C1 also to have the same charged. In this embodiment, too, the current is made to flow directly from the rectifier DB to the discharge lamp LP only through the inductance L3 for a fixed period, so that the overall efficiency can be improved while restraining the higher harmonics component at the low level, and the common utilization of the circuit elements for the chopper circuit and inverter circuit section can be attained for the effective dimensional minimization. Other constituents as well as the function and effect are the same as those in the foregoing embodiments.

Figure 11:
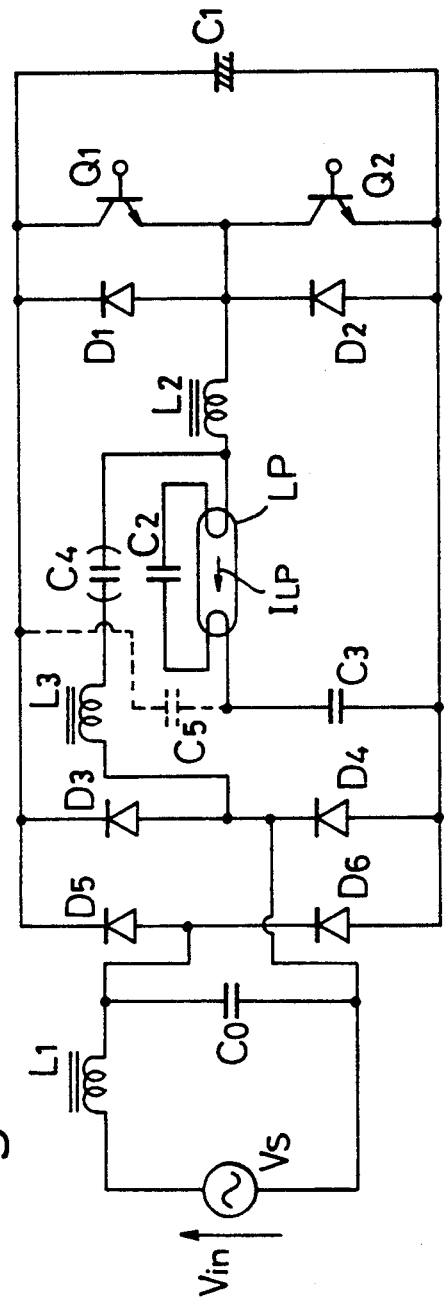
FIG. 11 is a circuit diagram showing an eighth embodiment of the inverter device according to the present invention.

In an eighth embodiment shown in FIG. 11, the impedance element Z1 comprising a series circuit of the inductance L3 and condenser C4 is connected to an end of the AC power source Vs, practically, to a junction point of the full-wave rectifier DB to the diodes D3 and D4, and the inductance L2 is employed as part of the oscillation circuit Z2 of the inverter circuit section. The condenser C2 is connected in parallel to the discharge lamp LP forming the load, and a discharge lamp lighting circuit to which the condenser C3 is connected in series is employed. The condenser C4 may be omitted, while a condenser C5 may be connected, as shown by broken lines in the drawing, between positive electrode of the condenser C1 and negative electrode of the condenser C3. In this case, it is made possible, by connecting the junction point of the impedance element Z1 to an end of the AC power source Vs, to cause a current to flow from the source Vs to a path of the inductance L1, diode D5, transistor Q1, inductance L2, condenser C4 and inductance L3 back to the source Vs during positive half cycles of the AC source power, and a current to flow from the source Vs to a path of the inductance L3, condenser C4, inductance L2, transistor Q2, diode D6 and inductance L1 back to the source Vs during negative half cycles of the source power.

Figure 12:
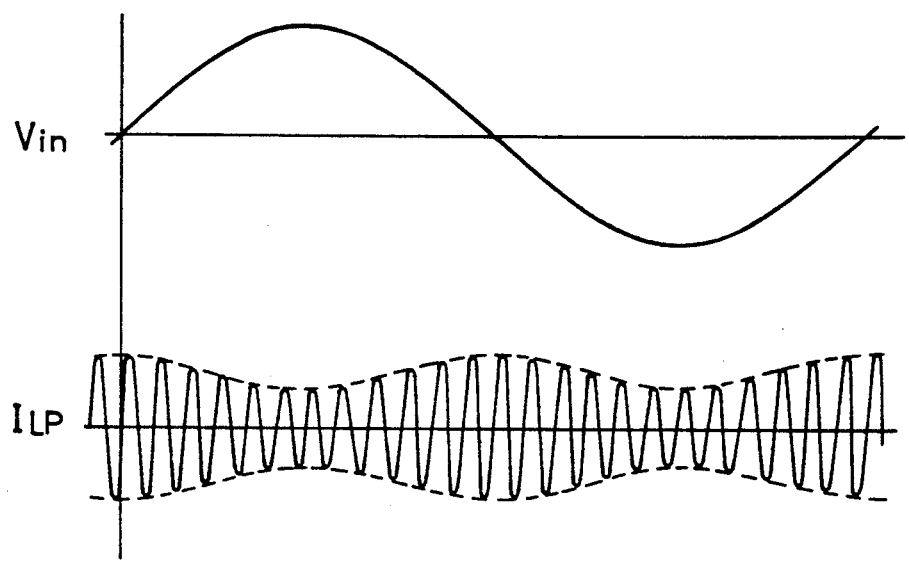
FIG. 12 is a diagram showing waveforms at respective parts in the inverter device of FIG. 11.

Referring further to this embodiment also with reference to FIG. 12, the load current ILP is inverse proportional in the amplitude to the magnitude of the input voltage Vin, so that the arrangement of this embodiment attains automatically the compensation for the source power fluctuation. That is, the maximum value in the amplitude of the load current ILP is determined by a voltage value of the smoothing condenser C1 so that, if the input voltage Vin increases, the voltage at the condenser C1 will rise and the maximum amplitude value of the load current ILP becomes larger. The minimum amplitude value on the other hand of the load current becomes smaller so that, when averaged by commercial source power cycle, the effective value of the load current ILP will not be varied much before and after the fluctuation. In the present embodiment, too, the input power-factor can be enhanced while restraining the higher harmonics component at a low level, and the common use of the circuit elements for the chopper circuit and inverter circuit section can be realized for the dimensional minimization. Other constituents as well as the function and effect are the same as those in the foregoing embodiments.

Figure 13:
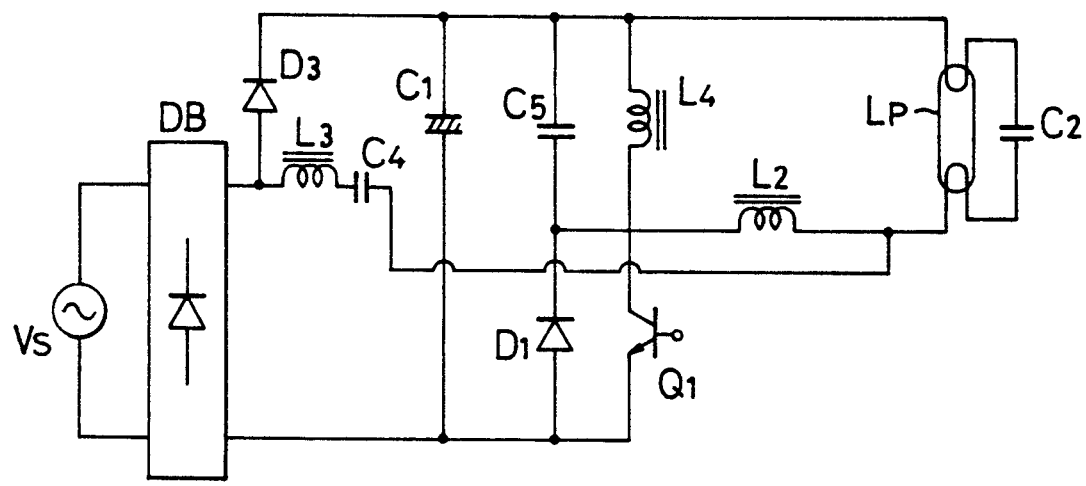
FIG. 13 is a circuit diagram showing a ninth embodiment of the inverter device according to the present invention.

In a nineth embodiment shown in FIG. 13, there is employed a single switching element for the inverter circuit section and, more practically, the inverter circuit section is formed with the transistor Q1, diode D1, inductances L2 and L4, condensers C2 and C5 and discharge lamp LP. In this case, a high frequency current is supplied to the discharge lamp LP with the resonating action of the condenser C5 and inductances L4 and L2. Further, a series circuit of the inductance L3 and condenser C4 is employed as the impedance element Z1. While the present embodiment is slightly different from the foregoing embodiments in respect of the system of the inverter circuit section, it is also enabled that the input current directly flows for a fixed period through a path of the rectifier DB, impedance element Z1, part of the oscillation circuit Z2 of the inverter circuit section and switching element Q1, and the common use of the circuit elements for the chopper circuit and inverter circuit section can be realized so as to promote the dimensional minimization. Other constituents as well as the function and effect of this embodiment are the same as those in the foregoing embodiments.

Figure 14:
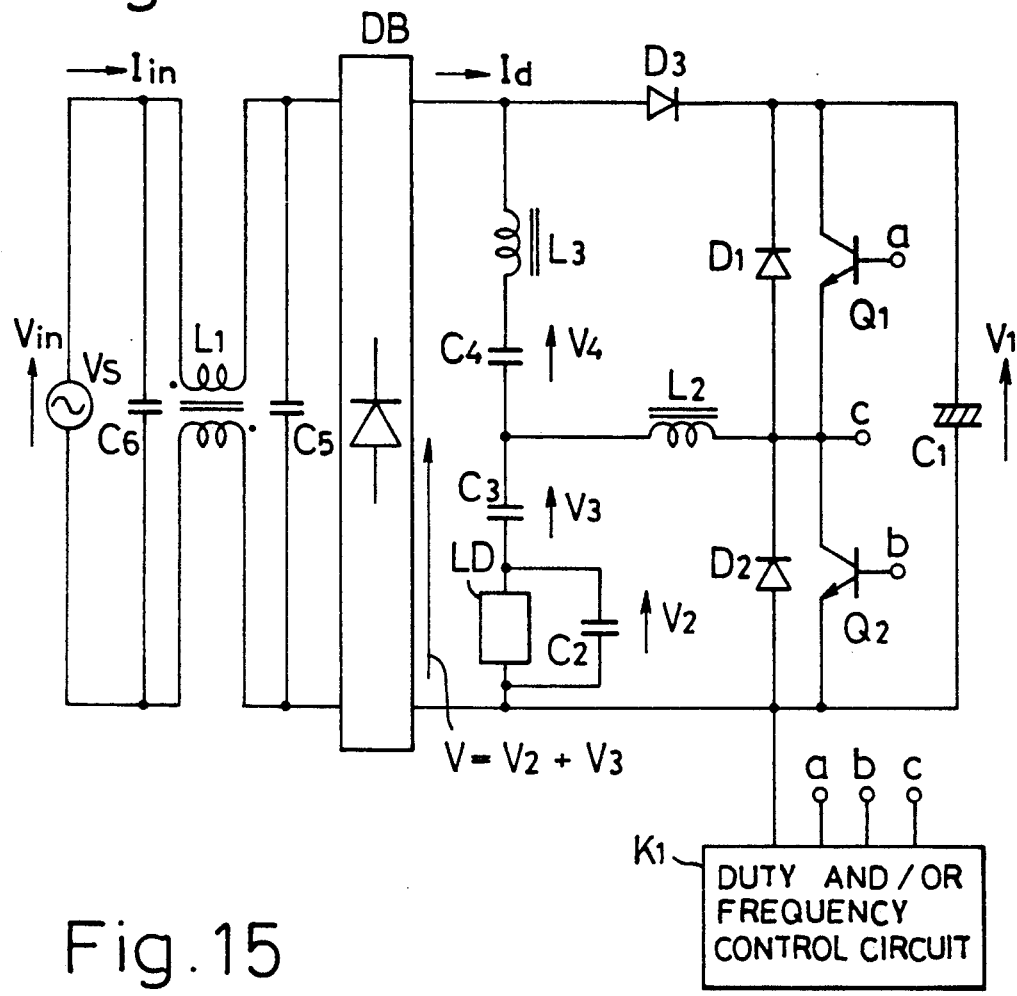
FIG. 14 is a circuit diagram showing a tenth embodiment of the inverter device according to the present invention.

In a tenth embodiment shown in FIG. 14, the transistors Q1 and Q2 in the inverter circuit section are provided with a duty and/or frequency control circuit K1 which is connected at its output terminals a and b to control terminals of the transistors Q1 and Q2 and at remaining output terminal c to a junction point between the transistors Q1 and Q2, so that the transistors Q1 and Q2 will be alternately turned ON and OFF at a predetermined duty or frequency.

Figure 15:
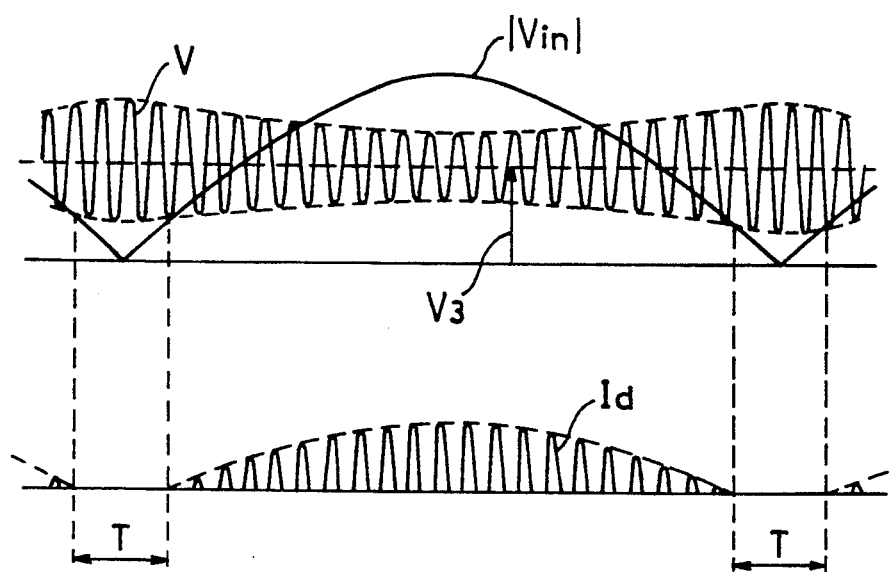
FIGS. 15 and 16 are explanatory diagrams for the operation of the inverter device of FIG. 14 with waveforms at respective parts thereof.
Figure 16:
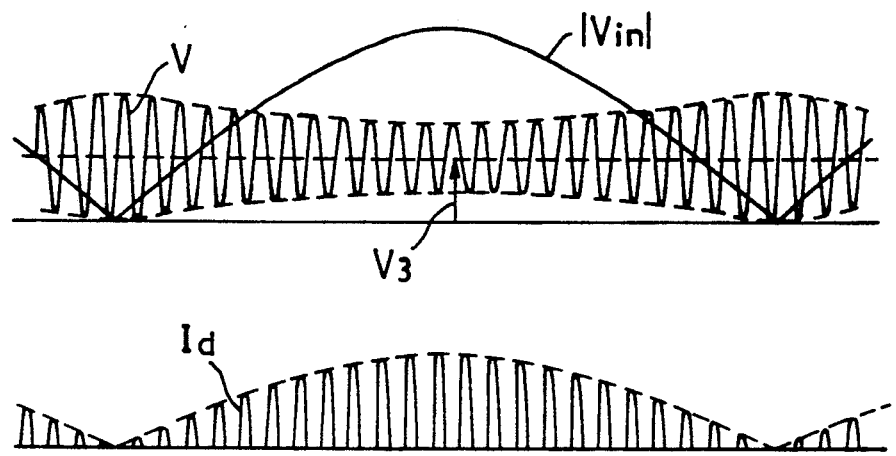

Referring to the operation of this embodiment of FIG. 14 in conjunction with FIGS. 15 and 16, the embodiment may involve an event where a quiescent period is caused in the input current due to that, depending on set constant of the impedance element Z1 or of the inverter circuit section, the input voltage may become $|Vin| < V$ at a period T adjacent $Vin \approx 0V$. Provided here that ON time of, for example, the transistor Q2 on lower side in FIG. 14 is prolonged by varying duty ratio of the transistors Q1 and Q2 by means of the control circuit K1, then the voltage V3 of the condenser C3 for cutting DC component in the inverter circuit section is lowered (see in particular FIG. 15). Due to this, there arises a possibility that, as seen in FIG. 16, a rectifier voltage $V (=V2+V3)$ shifts downwards as compared with that prior to the duty control, and $|Vin| > V$ may happen even when $Vin \approx 0V$. Consequently, any quiescent of the input current is made to disappear, the input current waveform is rendered to be close to the sinusoidal to elevate more the input power-factor than that prior to the duty control and to render the higher harmonics component to be at a further lower level. For realizing the above control, it is required to primarily detect $|Vin|$ and V, while means for detecting them may not be required to be particularized. What is important here is that the arrangement is so made that the voltage V3 at the condenser C3 for cutting DC component is controlled to eliminate any quiescent period of the input voltage $|Vin|$, and output current Id is sequentially supplied from the full-wave rectifier.

Figure 17:
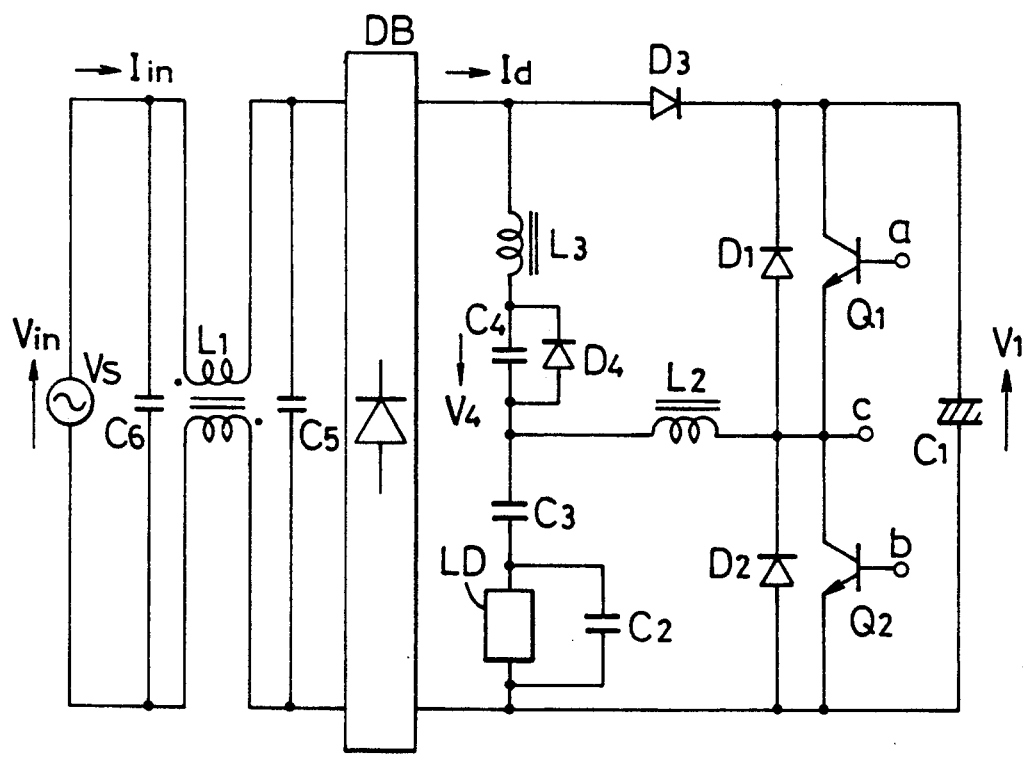
FIG. 17 is a circuit diagram showing an eleventh embodiment of the inverter device according to the present invention.
Figure 18:
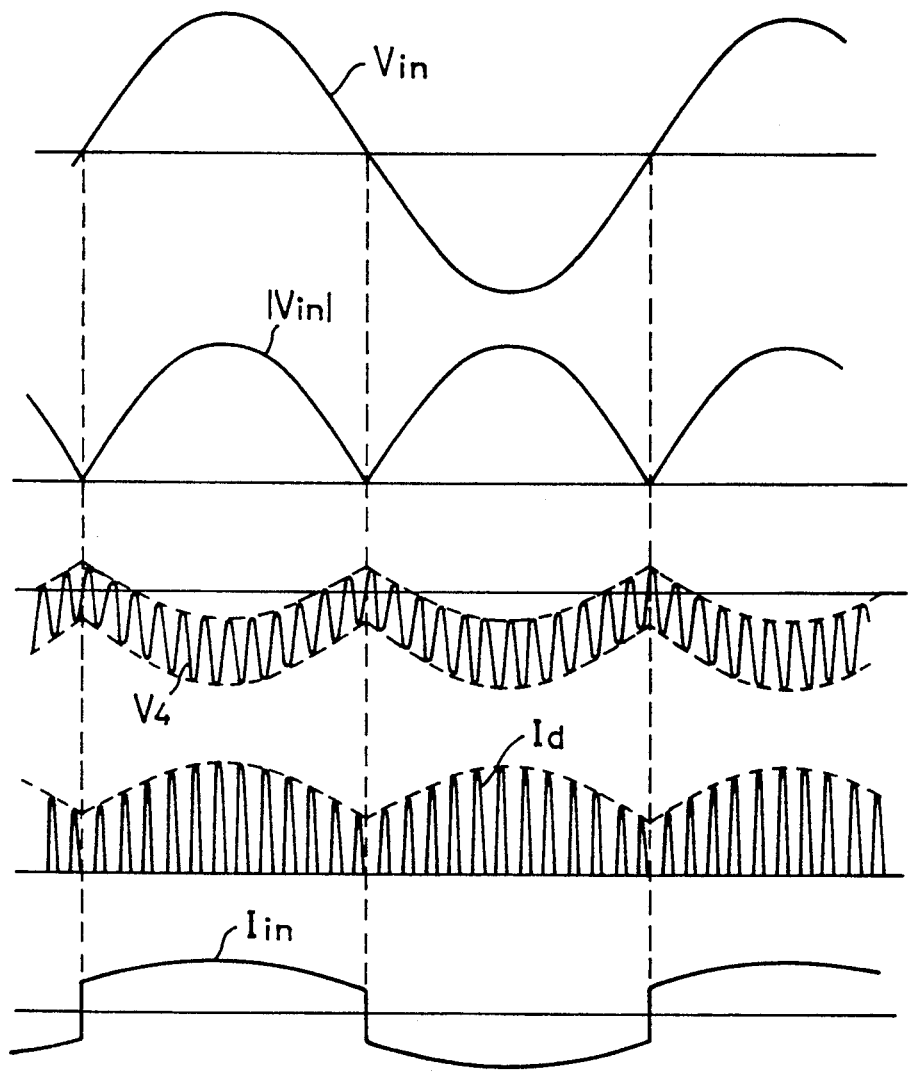
FIGS. 18 and 19 are explanatory diagrams for the operation of the inverter device of FIG. 17 with waveforms at respective parts thereof.
Figure 19:
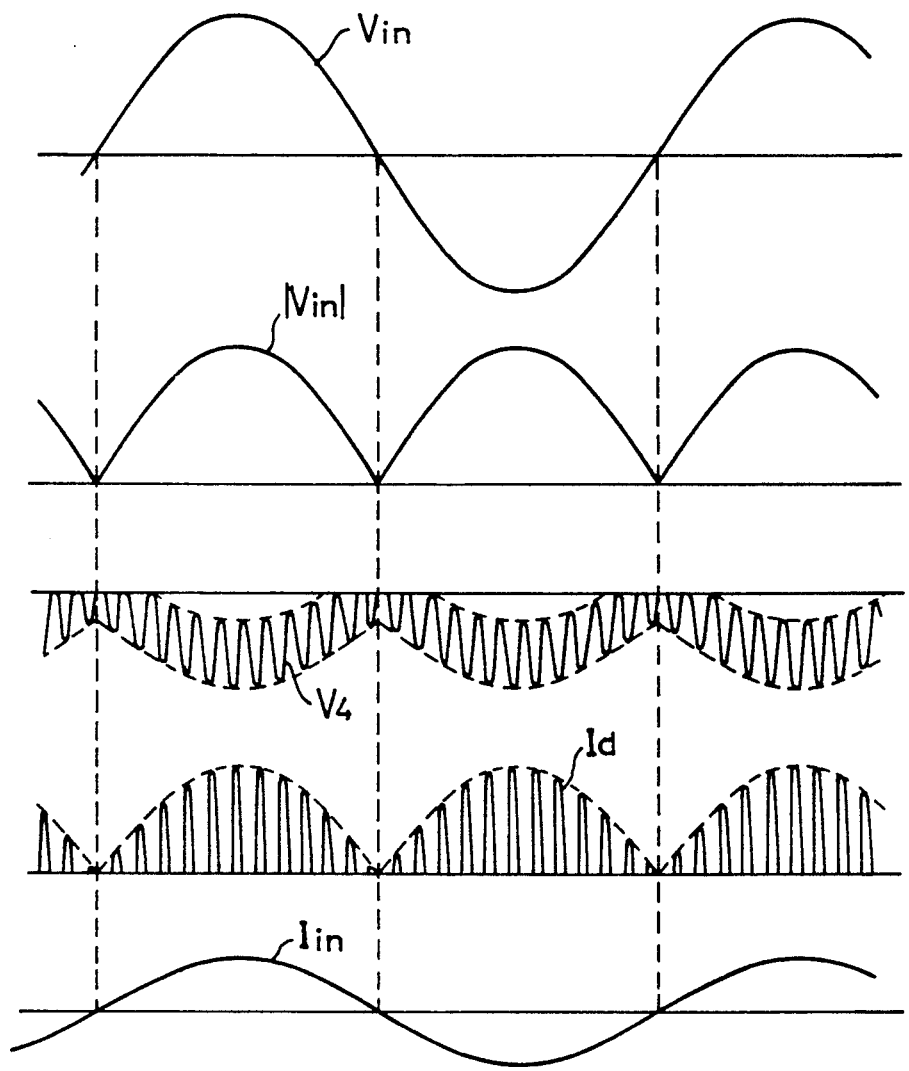

In an eleventh embodiment shown in FIG. 17, a diode D4 is connected across both ends of the condenser C4 forming part of the impedance element Z1. Assuming here that this diode D4 is absent, the transistor Q2 turned ON will cause the input current to flow through a path of the full-wave rectifier DB, inductance L3, condenser C4, inductance L2 and transistor Q2 and, as the transistor Q2 turns OFF, a current will flow through a circuit of the inductance L3 and condenser C4 in one direction for a fixed period but thereafter in inverse direction. As the other transistor Q1 turns ON here, the inductance L2, condenser C4 and inductance L3 will form a resonating system, the condenser C4 is charged thereby in direction of an arrow V4 shown in the drawing so as to reach a considerably high voltage. In this moment, it is apt to occur such a phenomenon that, notwithstanding that the source power voltage Vin is 0V, the condenser C4 is made to be a power source to cause a current to flow from the condenser C4 to the inductance L2 and transistor Q2, and the input current Iin is made discontinuous upon 0V of the source power voltage Vin as shown in waveform diagram of FIG. 18. In the presence of the diode D4 across the both ends of the condenser C4, on the other hand, the current even in the state where the condenser C4 is thereby charged in the direction of the arrow V4 can be bypassed through the diode D4 so as to restrain the charging in the arrow V4 direction of the condenser C4. Accordingly, it is prevented that, upon the turning ON of the transistor Q2, a current Id from the condenser C4 is superposed on rectifier output current Id of the full-wave rectifier DB, and the input current Iin is prevented from becoming discontinuous as shown in FIG. 18. That is, as will be clear when FIG. 19 is referred to, the input current Iin becomes similar to the input voltage Vin substantially in proportion thereto, and the input power-factor can be enhanced. Further, the circuit elements can be made employable in common to the chopper circuit and inverter circuit section to be effective to the dimensional minimization. Other constituents, function and effect of this embodiment are the same as those in the foregoing embodiments.

Figure 20:
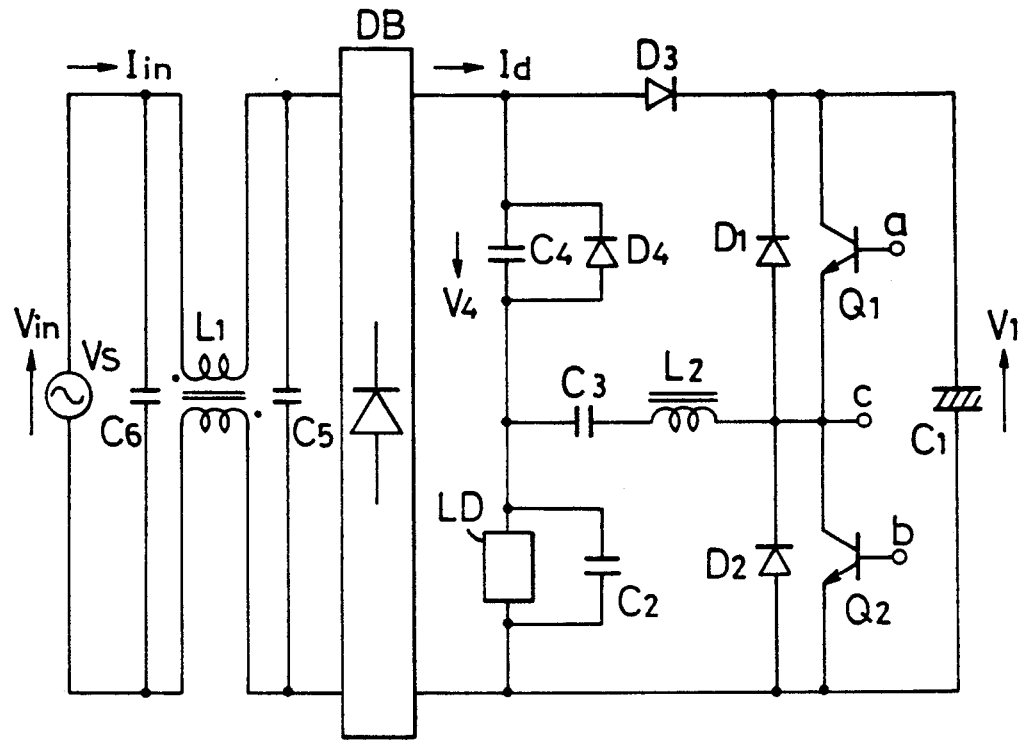
FIG. 20 is a circuit diagram showing a twelfth embodiment of the inverter device according to the present invention.

In a twelfth embodiment shown in FIG. 20, the condenser C4 only is employed as the impedance element Z1, and part of the oscillation circuit Z2 of the inverter circuit section comprises a series circuit of the inductance L2 and condenser C3 not participating in the oscillation while, also in the present embodiment, the bypassing diode D4 is connected in parallel to the condenser C4, and the same function as in the embodiment of FIG. 17 can be attained. Accordingly, the input current is made free of any discontinuity, and the input power-factor can be enhanced. The circuit elements are also made employable in common to the chopper circuit and inverter circuit section, to be effective to the dimensional minimization. Other constituents, function and effect of the embodiment are the same as those in the foregoing embodiments.

Figure 21:
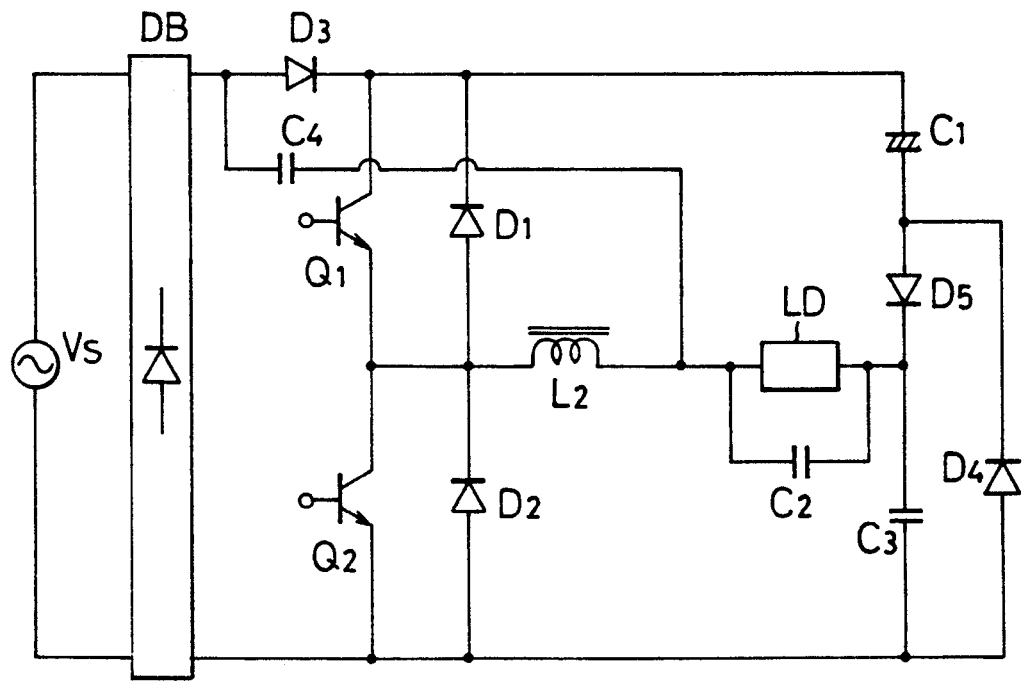
FIG. 21 is a circuit diagram showing a thirteenth embodiment of the inverter device according to the present invention.

In a thirteenth embodiment shown in FIG. 21, the condenser C4 only is employed as the impedance element Z1, and the smoothing condenser C1 is connected in series, through a diode D5, to the DC cutting condenser C3. Further, the diode D4 is connected to a series circuit of the diode D5 and condenser C3, and a discharge path for the condenser C1 is formed. In this case, the capacity connected to the output of the full-wave rectifier DB will be the series circuits of the condensers C4, C2 and C3 and of the condensers C1 and C3. Here, these condensers C2, C3 and C4 may be considerably much smaller in the capacity than the smoothing condenser C1, and any rush current occurring upon connection of the power source on AC side of the full-wave rectifier DB can be made extremely small due to wiring resistance component, inductance component, filter inductance component or the like. The charge of the condenser C1 at this time is mainly performed by a regenerative current in the inverter device, flowing through a path of the inductance L2, diode D1, condenser C1, diode D5, condenser C2 and discharge lamp LP. Also in the present embodiment, the common use of the circuit elements to the chopper circuit and inverter circuit section can be attained to be effective to the dimensional minimization. Other constituents, function and effect of the present embodiment are the same as those in the foregoing embodiments.

Figure 22:
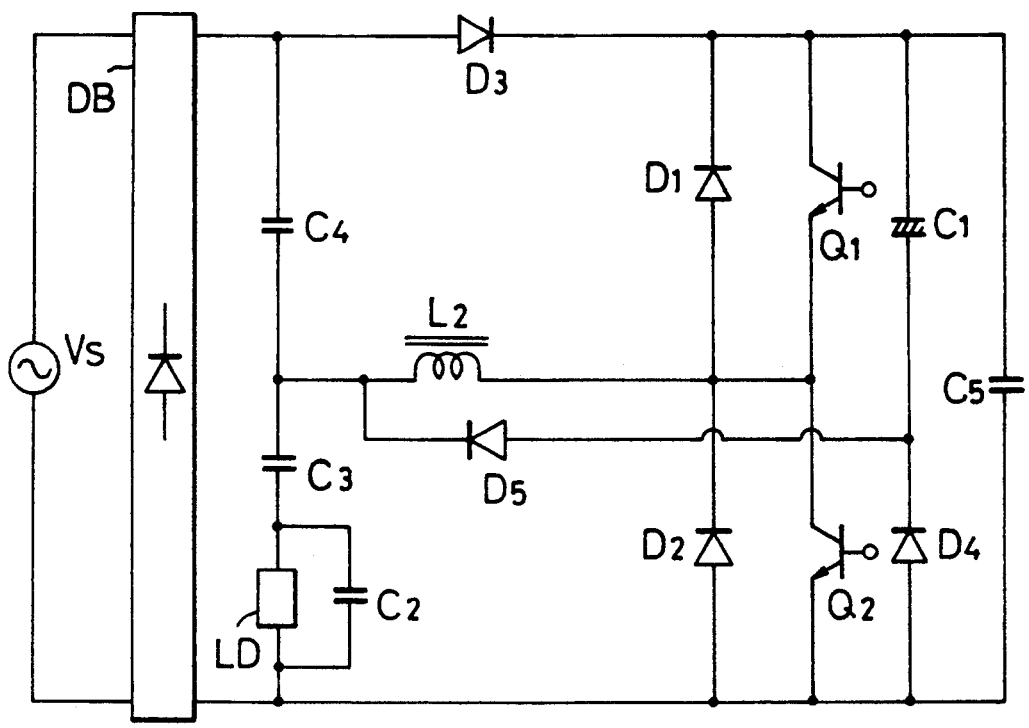
FIG. 22 is a circuit diagram showing a fourteenth embodiment of the inverter device according to the present invention.

In a fourteenth embodiments as shown in FIG. 22, a series circuit of the transistors Q1 and Q2 is connected through the diode D3 across both output terminals of the full-wave rectifier DB. To these transistors Q1 and Q2, the diodes D1 and D2 are connected in inverse parallel. Further, a parallel circuit of the load LD and condenser C2 is connected also across the output terminals of the full-wave rectifier with a series circuit of the condensers C4 and C3 interposed. Between a junction point of the transistors Q1 and Q2 and a junction point of the condensers C4 and C3, the inductance L2 is connected. Further across the DC side output terminals of the full-wave rectifier DB, there is connected, through the diode D3, a series circuit of the smoothing condenser C1, diode D5, inductance L2 and transistor Q2, and the condenser C1 is charged by a current flowing through this series circuit. Further, the charging voltage of the condenser C1 may be applied through the diode D4 to the series circuit of the transistors Q1 and Q2, and a condenser C5 for bypassing the high frequency is connected in parallel to the series circuit of the transistors Q1 and Q2.

Referring to the operation of this embodiment of FIG. 22, a turning ON of the transistor Q2 in a period in which the source voltage is high, causes the condenser C1 charged with a current flowing from the full-wave rectifier DB to a path of the diode D3, condenser C1, diode D5, inductance L2 and transistor Q2 and back to the rectifier DB, and the voltage-dropping chopper circuit operation can be carried out. While in the event when the source voltage is low such quiescent period of the input current, generally in the operating state of the voltage-dropping chopper circuit, the condenser C4 provided between part of the oscillation circuit in the inverter circuit section and the full-wave rectifier DB according to the present embodiment is effective to restrain the occurrence of such quiescent period. In this case, the capacity of this condenser C4 is set to be so small as to be able to charge and discharge a charge between the condenser C4 and the inductance L2 upon every switching operation of the transistor Q2, whereby a potential at junction point between the condenser C4 and the inductance L2 is caused to fluctuate in the sense of high frequency so that this potential at its lower level will be equipotential to or lower than that at the output terminals on the negative side of the full-wave rectifier DB. Accordingly, upon the turning ON of the transistor Q2 and irrespective of the source voltage value, there flows an input current to a path from the full-wave rectifier DB through the condenser C4, inductance L2 and transistor Q2 and back to the rectifier DB, and any quiescent period can be eliminated. In this case, the diode D3 is provided for discharging the charge in the condenser C4 so that, upon turning ON of the transistor Q1, the charge of this condenser C4 will be discharged to the inductance L2 and, upon turning ON of the transistor Q2, the input current will be allowed to flow.

As described in the above, the input power-factor can be enhanced and the higher harmonics current can be made at a low level similarly to the foregoing embodiments by connecting the condenser C4 to the inductance L2 forming part of the oscillation circuit in the inverter circuit section. Further, it is made possible to effectively restrain any rush current flowing abruptly into the smoothing condenser C1 upon connection of the power source, by establishing a voltage-dropping chopper circuit arrangement with utilization of the inductance L2 of the inverter circuit section and the transistor Q2 as the switching element so that the smoothing condenser C1 will be gradually charged with the duty constricted upon turning ON of the transistor Q2 immediately after the power source connection but gradually enlarged. Also in the present embodiment, the common use of the circuit elements for the chopper circuit and inverter circuit section can be attained to promote the dimensional minimization. Other constituents, function and effect are the same as those in the foregoing embodiments.

Figure 23:
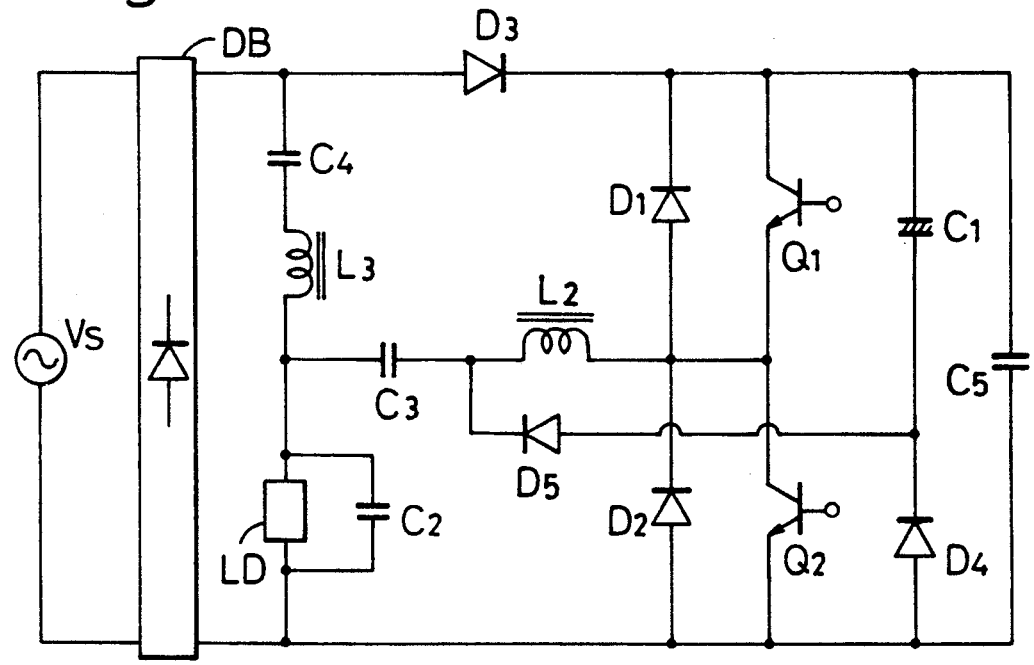
FIG. 23 is a circuit diagram showing a fifteenth embodiment of the inverter device according to the present invention.

In a fifteenth embodiment shown in FIG. 23, the inductance L3 is connected in series to the condenser C4 in FIG. 22, foregoing disposition of the condenser C3 in FIG. 22 is modified to be in series with the inductance L2, so that the input current will easily flow through this coupling condenser for cutting the DC component. In the present embodiment, too, the common use of the circuit elements for the chopper circuit and inverter circuit section is attained to promote the dimensional minimization. Other constituents, function and effect of this embodiment are the same as those in the foregoing embodiments.

What is claimed is:

1. An inverter device for a stable, high power-factor current supply, the inverter device comprising:
    a rectifier receiving a source voltage from an AC power source and providing at an output a pulsating DC voltage,
    smoothing means receiving said pulsating DC voltage from said rectifier and providing at an output a smoothed DC voltage, said smoothing means including a condenser,
    an inverter circuit section connected in parallel with said smoothing means and including switching means receiving said smoothed DC voltage from the smoothing means including a chopper circuit and an oscillation circuit for generating a high frequency voltage in response to ON and OFF operation of said switching means,
    an impedance element coupling said inverter circuit section to at least one of said AC power source and said rectifier and forming a current path for an input current to directly flow from said AC power source through said impedance element and the switching means to said oscillation circuit,
    a DC blocking condenser connected in series with said oscillation circuit for blocking a DC component, and
    means for controlling a voltage across the DC blocking condenser.

2. The device according to claim 1 wherein said oscillation circuit of said inverter circuit section includes an oscillation inductance and an oscillating condenser having a capacitance.

3. The device according to claim 2 wherein said smoothing means has a capacitance larger than the capacitance of said oscillating condenser.

4. The device according to claim 1 wherein said impedance element comprises an inductance.

5. The device according to claim 1 wherein said switching means comprises a pair of switching elements connected in series for alternating operation.

6. The device according to claim 1 wherein said impedance element comprises a condenser.

7. The device according to claim 1 wherein said impedance element comprises a series connection of an inductance and a condenser.

8. The device according to claim 1 wherein said oscillation circuit includes only one oscillation inductance, and said impedance element comprises only one inductance.

9. The device according to claim 1 wherein said smoothing means comprises a series circuit of a first condenser, a first diode, and a second condenser, and a second diode connected in parallel with said second condenser and said first diode in reverse polarity relative to said first diode.

10. The device according to claim 1 wherein said smoothing means is provided with a first current loop from the output of said rectifier through the smoothing means and a forward biased diode, an oscillation inductance included in said oscillation circuit of said switching means, and a second current loop from said oscillation inductance to the smoothing means during OFF operation of said switching means.

11. An inverter device for a stable, high power-factor current supply, the inverter device comprising:
- a rectifier receiving a source voltage from an AC power source and providing at an output a pulsating DC voltage,
- smoothing means receiving said pulsating DC voltage from said rectifier and providing at an output a smoothed DC voltage, said smoothing means including a condenser,
- an inverter circuit section connected in parallel with said smoothing means and including switching means receiving said smoothed DC voltage from the smoothing means including a chopper circuit and an oscillation circuit for generating a high frequency voltage in response to ON and OFF operation of said switching means,
- an impedance element coupling said inverter circuit section to at least one of said AC power source and said rectifier and forming a current path for an input current to directly flow from said AC power source through said impedance element and the switching means to said oscillation circuit,
- a condenser connected in series with said oscillation circuit for blocking a DC component, and
- means for controlling a voltage at the impedance element.

12. An inverter device for a stable, high power-factor current supply, the inverter device comprising:
- a rectifier receiving a source voltage from an AC power source and providing at an output a pulsating DC voltage,
- smoothing means receiving said pulsating DC voltage from said rectifier and providing at an output a smoothed DC voltage, said smoothing means including a condenser,
- an inverter circuit section connected in parallel with said smoothing means and including switching means receiving said smoothed DC voltage from the smoothing means including a chopper circuit and an oscillation circuit for generating a high frequency voltage in response to ON and OFF operation of said switching means,
- an impedance element coupling said inverter circuit section to said rectifier and forming a current path for an input current to flow from said AC power source through said impedance element and the switching means to said oscillation circuit,
- a DC blocking condenser connected in series with said oscillation circuit for blocking a DC component, and
- means for controlling a voltage across the DC blocking condenser.

13. The device according to claim 12 wherein said oscillation circuit of said inverter circuit section includes an oscillation inductance and an oscillating condenser having a capacitance.

14. The device according to claim 13 wherein said smoothing means has a capacitance larger than the capacitance of said oscillating condenser.

15. The device according to claim 12 wherein said impedance element comprises an inductance.

16. The device according to claim 12 wherein said switching means comprises a pair of switching elements connected in series for alternating operation.

17. The device according to claim 12 wherein said impedance element comprises a condenser.

18. The device according to claim 12 wherein said impedance element comprises a series connection of an inductance and a condenser.

19. The device according to claim 12 wherein said oscillation circuit includes only one oscillation inductance, and said impedance element comprises only one inductance.

20. The device according to claim 12 wherein said smoothing means comprises a series circuit of a first condenser, a first diode, and a second condenser, and a second diode connected in parallel with said second condenser and said first diode in reverse polarity relative to said first diode.

21. The device according to claim 12 wherein said smoothing means is provided with a first current loop from said rectifier through the smoothing means and a forward biased, diode, an oscillation inductance included in said oscillation circuit of said switching means, and a second current loop from said oscillation inductance to the smoothing means during OFF operation of said switching means.

22. An inverter device for a stable, high power-factor current supply, the inverter device comprising:
- a rectifier receiving a source voltage from an AC power source and providing at an output a pulsating DC voltage,
- smoothing means receiving said pulsating DC voltage from said rectifier and providing at an output a smoothed DC voltage, said smoothing means including a condenser,
- an inverter circuit section connected in parallel with said smoothing means and including switching means receiving said smoothed DC voltage from the smoothing means including a chopper circuit and an oscillation circuit for generating a high frequency voltage in response to ON and OFF operation of said switching means,
- an impedance element coupling said inverter circuit section to said rectifier and forming a current path for an input current to flow from said AC power source through said impedance element and the switching means to said oscillation circuit, a condenser connected in series with said oscillation circuit for blocking a DC component, and means for controlling a voltage at the impedance element.

23. An inverter device for a stable, high power-factor current supply, the inverter device comprising:

a rectifier receiving a source voltage from an AC power source and providing at an output a pulsating DC voltage, smoothing means receiving said pulsating DC voltage from said rectifier and providing at an output a smoothed DC voltage, said smoothing means including a condenser, an inverter circuit section connected in parallel with said smoothing means and including switching means receiving said smoothed DC voltage from the smoothing means including a chopper circuit and an oscillation circuit for generating a high frequency voltage in response to ON and OFF operation of said switching means, and an impedance element coupling said inverter circuit section to said AC power source and forming a current path for an input current to flow, from said AC power source through said impedance element and the switching means to said oscillation circuit.

24. The device according to claim 23 wherein said oscillation circuit of said inverter circuit section includes an oscillation inductance and an oscillating condenser having a capacitance.

25. The device according to claim 24 wherein said smoothing means has a capacitance larger than the capacitance of said oscillating condenser.

26. The device according to claim 23 wherein said impedance element comprises an inductance.

27. The device according to claim 23 wherein said switching means comprises a pair of switching elements connected in series for alternating operation.

28. The device according to claim 23 wherein said switching means comprises a single switching element.

29. The device according to claim 23 wherein including a filter circuit connected between said AC power source and said rectifier, said filter circuit including an inductance and a condenser.

30. The device according to claim 23 wherein said oscillation circuit includes only one oscillation inductance, and said impedance element comprises only one inductance.

31. The device according to claim 23 wherein comprising a DC blocking condenser connected in series with said oscillation circuit for blocking a DC component and means for controlling a voltage across the DC blocking condenser.

32. The device according to claim 23 wherein said smoothing means is provided with a first current loop from said rectifier through the smoothing means and a forward biased diode, an oscillation inductance included in said oscillation circuit of said switching means, and a second current loop from said oscillation inductance to the smoothing means during OFF operation of said switching means.

33. The device according to claim 23 wherein said smoothing means comprises a series circuit of a first condenser, a first diode, and a second condenser, and a second diode connected in parallel with said second condenser and said first diode in reverse polarity relative to said first diode.

34. The device according to claim 23 wherein said impedance element comprises a condenser.

35. The device according to claim 23 wherein said impedance element comprises a series connection of an inductance and a condenser.

36. The device according to claim 23 comprising a condenser connected in series with said oscillation circuit for blocking a DC component and means for controlling a voltage at the impedance element.

* * * * *